3,173,954
PREPARATION OF HEXAALKYL-1,3,5-CYCLOHEXANETRIONES
Raymond D. Clark, Kingsport, Tenn., assignor to Eastman Kodak Company, Rochester, N.Y., a corporation of New Jersey
No Drawing. Filed Sept. 20, 1961, Ser. No. 139,363
4 Claims. (Cl. 260—586)

This invention relates to the preparation of alicyclic triketones and more particularly to a process for preparing hexaalkyl-1,3,5-cyclohexanetriones from 2,2,4,4-tetraalkyl-3-hydroxy-3-butenoic acid, β-lactones.

Alicyclic triketones are known. For example, hexamethyl-1,3,5-cyclohexanetrione or hexamethyl phloroglucinol has been prepared by a process wherein phloroglucinol is methylated by means of methyliodide and alkali. However, the prior art processes have proven unsatisfactory for one reason or another for commercial production of hexamethyl-1,3,5-cyclohexanetrione and related compounds.

A new method for preparing hexaalkyl-1,3,5-cyclohexanetriones (referred to hereinafter as "triones") has been described in the patent application of R. G. Nations, Serial No. 27,529, filed May 9, 1960, now U.S. Patent No. 3,091,642. In this method tetraalkyl-1,3-cyclobutanediones are converted to the triones by heating in the presence of an alkali-metal alcoholate. While this method has important advantages over earlier procedures, I have now made a further advance in the art of preparing such triones.

The process of my invention is based on my discovery that the β-lactones of 2,2,4,4-tetraalkyl-3-hydroxy-3-butenoic acids can be converted to the triones. The process of my invention in general comprises heating a tetraalkyl-3-hydroxy-3-butenoic acid β-lactone in the absence of labile hydrogen atoms and in the presence of a basic catalyst, preferably an alkali-metal alkoxide. The procedure produces the hexaalkyl-1,3,5-cyclohexanetriones in good yield and is well adapted to commercial production of such alicyclic triketones. The latter are useful as chemical intermediates; for example, they may be hydrogenated to corresponding trihydric alcohols for preparation of alkyd resins or the alcohols can be converted to esters which are useful as high temperature lubricants or as plasticizers having high thermal and oxidative stability.

The process of my invention offers advantages over the procedure employing the isomeric tetraalkyl-1,3-cyclobutanediones as starting materials. Thus, the lactones are normally liquid materials while the diones are normally solids. For instance, tetramethyl-1,3-cyclobutanedione is a volatile, easily sublimed solid while the isomeric lactone is a liquid at normal temperature and pressure. The lactone is therefore more convenient to employ as a reagent and its use provides an important advantage for my process. Another feature that distinguishes my process, as discussed more fully hereinafter, is that under certain conditions my process, in addition to the trione, produces a substantial yield of a valuable polymer.

In accordance with the invention I prepare hexaalkyl-1,3,5-cyclohexanetriones by heating a tetraalkyl-3-hydroxy-3-butanoic acid β-lactone with a basic catalyst in the absence of labile hydrogen atoms until the transformation to the trione is substantially complete, followed by separation and purification of the product by distillation, recrystallization or other conventional techniques. The reaction takes place according to the following equation:

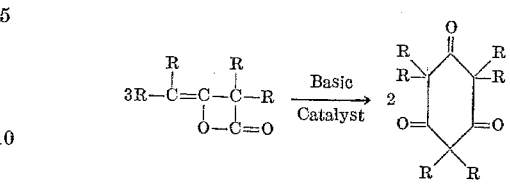

wherein the substituents R represent the same or different alkyl radicals of from 1 to 4 carbon atoms. The substituents R attached to a common carbon atom can also be alkylene groups which, with the carbon atom to which they are attached, form a 5 or 6 membered saturated carbocyclic ring. For convenience I use the terms "tetraalkyl" and "hexaalkyl" to designate all of such terta- and hexa-substituted lactones and triones.

The tetraalkyl-3-hydroxy-3-butenoic acids β-lactones can be prepared by the catalytic rearrangement of tetraalkyl-1,3-cyclobutanediones as disclosed in my co-pending U.S. application Serial No. 108,739, filed May 9, 1961, now U.S. Patent No. 3,062,837. The procedure comprises heating the reaction mixture of the dione and a catalytic amount of an aprotonic Lewis acid, such as aluminum chloride, at a temperature of 100 to 175° C. The tetraalkyl-1,3-cyclobutanediones can in turn be prepared by dimerization of disubstituted ketenes such as dimethylkentene, diethylketene, ethylmethylketene, butylethylketene, diisobutylketene, tetramethyleneketene, pentamethyleneketene, etc. ("Organic Reactions," R. Adams, editor, John Wiley and Sons Inc., New York, 1946, volume 13, chapter 3, "Preparation of Ketene and Ketene Dimers").

Within the suitable ranges of reaction variables of the present process the trione can be obtained as substantially the sole reaction reaction product or in admixture with other reaction products. The principal other products obtained with the lactone are polymers of the type disclosed in my co-pending patent application Serial No. 108,737, filed May 9, 1961, which discloses the formation of certain macromolecular, highly crystalline, high-melting, poly-enol esters, consisting essentially of units having the formula:

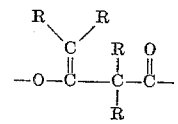

Another product obtained in low yield with the trione under conditions of my process is the 2,2,4,4,6,6-hexaalkyl-3-oxo-5-hydroxy-5-hexenoic acid, δ-lactone of the type:

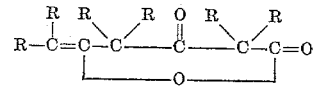

Within the suitable ranges of reaction conditions the particular combination of conditions employed determines whether the trione is obtained as substantially the sole reaction product or is obtained in admixture with the described polymer. The principal conditions influencing this result are reaction temperature, reaction time, the strength or degree of basicity of the basic catalyst and the ratio of lactone starting material to catalyst. The more severe or vigorous combinations of these reaction variables favor the formation of trione while the milder conditions favor the polymer.

When the polymer and trione are formed simultaneously the length of reaction time determines which product is formed in excess, the polymerization reaction being faster than the trione formation. The polymerization reaction is also reversible. Polymer is first formed and then reverts to monomer which is slowly converted to trione. The trione reaction is not reversible. Therefore after sufficient reaction time all of the lactone as well as the polymer is converted to trione. The following indicates the possible reactions:

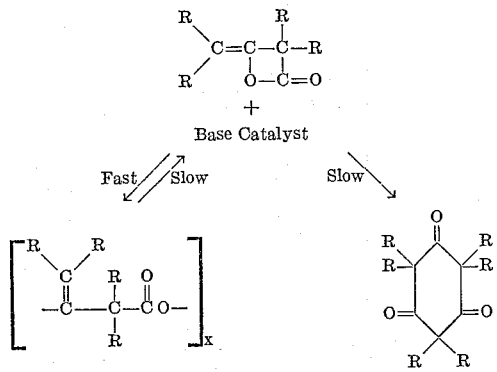

In general, the trione can be produced in accordance with the invention over a temperature range from about 90 to 350° C. The preferred range is from 110° C. to near the normal boiling point of the lactone starting material. The reaction time can also vary considerably. Reaction time as short as about 0.5 hour is adequate to produce some trione at the higher temperatures. Normally, reaction time is at least one hour for a good yield of trione and reaction times as long as five (5) hours or longer can be employed with the lower reaction temperatures or with less strongly basic catalysts or to obtain a reaction product that is all trione and contains little or no polymer.

Suitable catalysts for the process are basic compounds of metals from groups Ia, IIa or IIIa of the Periodic Table (Lange's "Handbook of Chemistry", 9th Ed., Handbook Publishers, Inc., pages 56–57). Of this class of bases, the strong bases can be employed when severe reaction conditions are desired and the weak bases when milder conditions are desired. For the present purposes I define a strong base as being a metal salt of an acid weaker than water, that is, an acid having a $pK_a$ greater than 14. I define a weak base as being a metal salt of an acid as strong as water but weaker than oxalic acid, that is, an acid having a $pK_a$ greater than 1.5 but not greater than 14.

Examples of suitable strong bases include: (a) metal alkoxides, especially alkali-metal alkoxides such as sodium methoxide, potassium ethoxide, etc., (b) metal alkyls such as phenyl lithium, diethylmagnesium, etc., and (c) metal amides such as sodium amide, N-butylpotassium amide, etc. Alkali-metal alkoxides or alcoholates such as those prepared from alkali metals such as sodium or potassium and alcohols such as methanol, ethanol, 1-propanol, 2-propanol, 1-butanol or 2-methyl-1-butanol, are the preferred catalysts for the process of the invention.

Examples of suitable weak bases include: (a) metal hydroxides such as sodium hydroxide, potassium hydroxide, etc., (b) metal oxides such as lithium oxide, barium oxide, etc., (c) metal acetates such as sodium acetate, magnesium acetate, (d) metal carbonates such as potassium carbonate, calcium carbonate, etc.

The preferred range of catalyst concentration is from about 0.01 to about 2 weight percent of the reaction mixture. The process is operable with catalyst concentrations as low as about 0.0001% and with considerably higher catalyst concentrations, e.g., 50 weight percent or higher. However, the amount of catalyst must be less than a molar equivalent of the amount of lactone starting material, particularly if an alkali-metal alkoxide is employed as the catalyst. The latter compounds, in the absence of labile hydrogen atoms, react with the lactone in equimolar ratios to form alkali-metal enolates of acetoacetic esters to the exclusion of the desired triones. To avoid this and to ensure production of a substantial yield of the desired trione the amount of catalyst must be less than 1 mole per mole of lactone and, preferably, is less than 2 weight percent of the amount of lactone.

A solvent may or may not be used in the process. If used, it should be an inert solvent which will not react with the catalyst, with the starting material or with the product. I avoid the use of solvents such as alcohols, water, amines, acids, etc., which have a hydrogen atom that is easily removable as a proton, as the conversion of the lactone to the trione in the presence of a basic catalyst, particularly an alkali-metal alkoxide, should be carried out in the absence of labile hydrogen atoms. Suitable solvents are hydrocarbons, ethers and the like. Examples include n-heptane, toluene, the xylenes, diphenyl ether and the like.

In selecting particular combinations of reaction conditions from the ranges disclosed above for producing the lactone the following principles apply, it being understood that under the milder combinations of conditions a mixture comprising various ratios of polymer and trione can be obtained while under the most severe combinations of conditions the reaction product will be substantially entirely trione.

To obtain the trione at temperatures below 110° C., the catalyst should be a strong base and the reaction time or heating period should be greater than 1 hour.

To obtain the trione at temperatures greater than 110° C. but less than 200° C. a weak base or strong base can be used. However, if a weak base is used in combination with a temperature in the lower portion of the range the heating period must be longer than 5 hours. At temperatures at the upper end of the range, i.e., near 200° C., significant yields of trione are obtained in 1 hour even with a weak base as catalyst. If a strong base is used as the catalyst in this temperature range trione is formed in less than an hour.

At temperatures in the range of 200 to 350° C. trione can be obtained in a short time, even with a weak base as catalyst, and with a strong base the reaction product is substantially entirely trione even with a relatively short reaction time.

The following example illustrates the process of the invention:

*Example.—Preparation of hexamethyl-1,3,5-cyclohexanetrione*

A mixture of 316 g. of 2,2,4-trimethyl-3-hydroxy-3-pentenoic acid, β-lactone and 5.2 g. of sodium methoxide was heated rapidly. When the temperature reached 90° C., an exothermic reaction began and the temperature rose to 230° C. without further heating. When the reaction began to subside, heating was resumed and the mixture was refluxed for 1 hour. The product was cooled to 100° C., poured into water, stirred with a Waring blendor to pulverize the solid material, filtered, and the solid was washed with water and dried to give 274 g. (87%) of hexamethyl-1,3,5-cyclohexanetrione, M.P. 76–79° C. After one recrystallization from ethyl alcohol, 212 g. (67%) of pure product, M.P. 79–80° C., was obtained.

The invention has been described in considerable detail with particular reference to certain preferred embodiments thereof, but it will be understood that variations and modifications can be effected within the spirit and scope of the invention as described hereinabove, and as defined in the appended claims.

I claim:
1. The process for preparing a hexaalkyl-1,3,5-cyclohexanetrione which comprises contacting in the absence of labile hydrogen atoms a 2,2,4,4-tetraalkyl-3-hydroxy-3-butenoic acid, β-lactone, wherein the alkyl substituents are selected from the group consisting of alkyl groups of from 1 to 4 carbon atoms and alkylene groups attached to a common carbon atom which, with the carbon atoms to which they are attached, form a 5 to 6 membered saturated, carbocyclic ring, with less than an equimolar amount of a basic catalyst which is a compound of a metal selected from the group consisting of the metals of Groups Ia and IIa of the Periodic Table under a combination of reaction conditions of temperature, reaction time and strength of the basic catalyst, including a temperature of above 200 to 350° C. of severity sufficient to yield said hexaalkyl-1,3,5-cyclohexanetrione as substantially the sole conversion product.

2. The process for preparing a hexaalkyl-1,3,5-cyclohexanetrione which comprises contacting a 2,2,4,4-tetraalkyl-3-hydroxy-3-butenoic acid, β-lactone, wherein the alkyl substituents are selected from the group consisting of alkyl groups of from 1 to 4 carbon atoms and alkylene groups attached to a common carbon atom which, with the carbon atom to which they are attached, form a 5 to 6 membered saturated, carbocyclic ring, with a catalytic amount of an alkali-metal alkoxide, in the absence of labile hydrogen atoms, and at a combination of temperature and reaction time, including a temperature of above 200 to 350° C. of severity sufficient to yield said hexaalkyl-1,3,5-cyclohexanetrione as substantially the sole conversion product.

3. The process for preparing a hexaalkyl-1,3,5-cyclohexanetrione which comprises contacting a 2,2,4,4-tetraalkyl-3-hydroxy-3-butenoic acid, β-lactone, wherein the alkyl substituents are selected from the group consisting of alkyl groups of from 1 to 4 carbon atoms and alkylene groups attached to a common carbon atom which, with the carbon atom to which they are attached, form a 5 to 6 membered saturated, carbocyclic ring, with a catalytic amount of an alkali-metal alkoxide, in the absence of labile hydrogen atoms, and at a temperature above 200° C. to 350° C. and recovering the hexaalkyl-1,3,5-cyclohexanetrione as substantially the sole conversion product.

4. The process for preparing hexamethyl-1,3,5-cyclohexanetrione which comprises contacting in the absence of labile hydrogen atoms 2,2,4-trimethyl-3-hydroxy-3-pentenoic acid, β-lactone with 0.01 to 2 weight percent of an alkali-metal alkoxide at a temperature above 200° C. to 350° C. for at least about one hour and recovering hexamethyl-1,3,5-cyclohexanetrione as substantially the sole conversion product.

No references cited.

LORRAINE A. WEINBERGER,
*Acting Primary Examiner.*
CHARLES B. PARKER, LEON ZITVER, *Examiners.*